United States Patent
Gnadinger et al.

(10) Patent No.: US 6,932,317 B2
(45) Date of Patent: Aug. 23, 2005

(54) LOW POWER DC SOLENOID VALVE

(75) Inventors: Errin Whitney Gnadinger, Louisville, KY (US); Jerrod Aaron Kappler, Louisville, KY (US); Jay Andrew Broniak, Louisville, KY (US)

(73) Assignee: General Electric Company, Schenectady, NY (US)

(*) Notice: Subject to any disclaimer, the term of this patent is extended or adjusted under 35 U.S.C. 154(b) by 50 days.

(21) Appl. No.: 10/458,660

(22) Filed: Jun. 10, 2003

(65) Prior Publication Data

US 2004/0251440 A1 Dec. 16, 2004

(51) Int. Cl.⁷ ............................................. F16K 31/12
(52) U.S. Cl. ................................... 251/45; 251/129.05
(58) Field of Search ........................... 251/38, 45, 46, 251/129.05

(56) References Cited

U.S. PATENT DOCUMENTS

| | | | |
|---|---|---|---|
| 3,738,607 A | * 6/1973 | Peruglia | 251/30.03 |
| 4,922,217 A | * 5/1990 | Buscher | 335/229 |
| 4,981,280 A | 1/1991 | Brandenberg | |
| 5,058,624 A | 10/1991 | Kolze | |
| 5,904,334 A | * 5/1999 | Grunert et al. | 251/120 |
| 6,019,441 A | * 2/2000 | Lloyd et al. | 303/156 |
| 6,534,958 B1 | 3/2003 | Graber et al. | |

* cited by examiner

Primary Examiner—Edward K. Look
Assistant Examiner—John K. Fristoe, Jr.
(74) Attorney, Agent, or Firm—George L. Rideout, Jr.; Armstrong Teasdale LLP

(57) ABSTRACT

The present invention comprises a diaphragm type solenoid fluid valve assembly of the class used in the on/off control of pressurized fluid flow. The valve assembly has a housing, a solenoid, and a magnetized cylindrical armature engagingly coupled to the solenoid and residing within the hollow center of the solenoid. The armature further has a spring affixed to one end of the armature and affixed to the end of the solenoid, wherein the spring and armature are capable of linear motion within the fluid chamber of the valve housing and within the cylindrical plunger guide of the solenoid. The linear motion is controlled by the magnetic field of the solenoid and the spring so as to enable the magnetized armature to abut against the orifice fluid exit of the orifice plate to prevent fluid flow there-through. The valve assembly further comprises a solenoid driver adapted to generate a pulse width modulated signal having two voltage levels other than zero volts, so as to control valve operation, wherein the first voltage level is to initiate movement of the magnetized armature, and the second voltage level is to hold the magnetized armature in the energized position.

11 Claims, 5 Drawing Sheets

LOW POWER DC SOLENOID VALVE

BACKGROUND OF THE INVENTION

This invention relates to a DC current driven solenoid and more particularly to a magnetized armature DC solenoid valve typically utilized in magnetic flow control devices.

Historically, when electromagnetic solenoid valves are used to control pressurized fluids, a relatively high input power is required to control the solenoid because of the force of the fluid pressure. Solenoid valves have been historically used to control fluid flow using a flexible diaphragm assembly, as is illustrated, for example, in U.S. Pat. No. 4,349,045. Additionally, permanent magnets have been utilized in solenoid valves to enhance the pull force of the armature in the solenoid valve, as illustrated, for example, in U.S. Pat. No. 4,564,046. Additionally, solenoid valves have been utilized which use a non-magnetized armature in a diaphragm assembly to control fluid flow as illustrated in FIG. 1. Heretofore, it has not been suggested or taught to combine the features described above into a diaphragm valve assembly to provide a very low power solenoid valve to control high pressure. It would be desirable to employ a very lower power electromagnet solenoid valve to control pressurized fluid. This would enable low power drive circuitry to be utilized in the control of the solenoid valve, as opposed to either high power circuitry or relay driven circuits. Additionally, the use of a low power solenoid valve would enable the elimination of the high power input at the fluid interface.

BRIEF SUMMARY OF THE INVENTION

In an exemplary embodiment, the present invention consists of a diaphragm type solenoid fluid valve assembly of the class used in the on/off control of pressurized fluid flow, wherein the valve assembly has a housing, a solenoid, a solenoid end, and the valve assembly consists of a magnetized cylindrical armature engagingly coupled to the solenoid and residing within the hollow center of the solenoid. The armature further has a spring between the armature and an end of the solenoid, wherein the spring and armature are capable of linear motion within the fluid chamber of the valve housing and within the cylindrical plunger guide of the solenoid. The linear motion of the armature is controlled by the magnetic field of the solenoid and the spring to enable the magnetized armature to abut against the orifice fluid exit of the orifice plate to prevent fluid flow there-through. A solenoid driver is adapted to generate a pulse width modulated signal having two voltage levels other than zero volts, to control valve operation. The first voltage level is to initiate movement of the magnetized armature, and the second voltage level is to hold the magnetized armature in the energized position.

DETAILED DESCRIPTION OF THE INVENTION

The present invention operates to control pressurized fluid flow in a fluid valve assembly. When the electromagnetic solenoid is activated a magnetically charged armature is retracted into the solenoid center creating a fluid exit path for the fluid in the diaphragm, thereby resulting in a fluid pressure differential in the diaphragm. The diaphragm retracts away from an exit port which normally blocks the high pressure fluid flow there-through. The high pressure fluid is thus able to flow around the diaphragm and out the exit port, correspondingly causing the diaphragm to close and to remain closed so long as residual fluid pressure exits on the side of the armature and diaphragm tip end. When the solenoid is de-energized a spring force repositions the armature back over the fluid exit path causing the pressure differential in the diaphragm to dissipate. The diaphragm thus expands to cover the fluid exit port halting further fluid flow.

Figure 1:
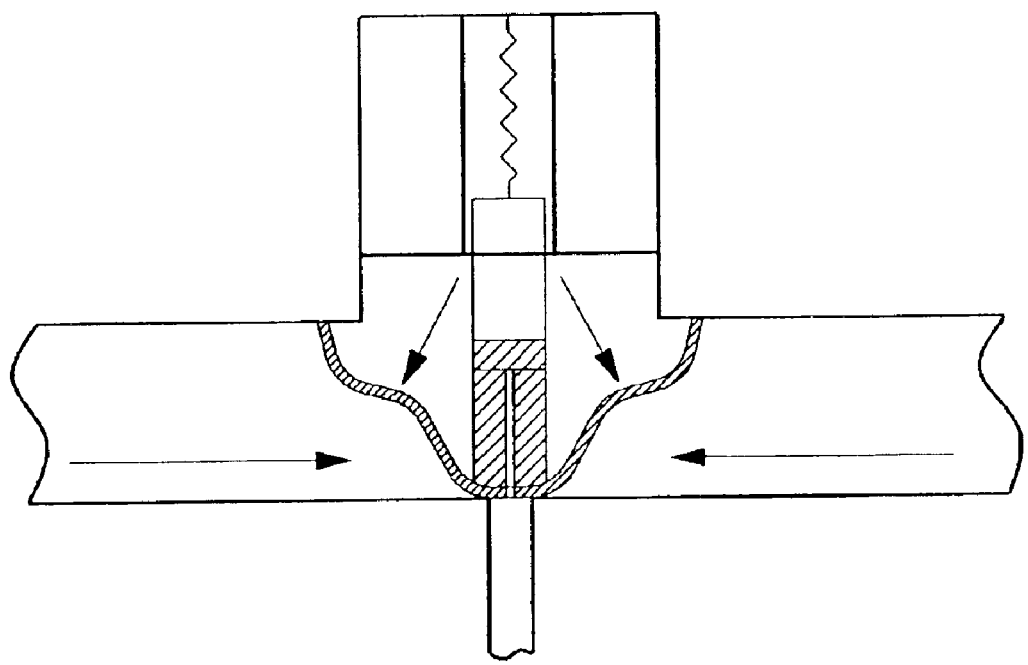
FIG. 1 is an illustration of a prior art electromagnetic solenoid valve used to control fluid flow.

It has been historically known to utilize the advantages of a diaphragm to control fluid flow. FIG. 1 is an exemplary illustration of such a, prior art, solenoid valve assembly. When the electromagnetic solenoid is activated a magnetically charged armature is retracted into the solenoid center creating a fluid exit path for the fluid in the diaphragm, thereby resulting in a fluid pressure differential in the diaphragm. The diaphragm retracts away from an exit port which normally blocks the high pressure fluid flow there-through. The high pressure fluid is thus able to flow around the diaphragm and out the exit port. When the solenoid is de-energized a spring force repositions the armature back over the fluid exit path causing the pressure differential in the diaphragm to dissipate. The diaphragm is inflated and deflated based on the differential pressure within the diaphragm. A non-magnetized armature controls the pressure within the diaphragm.

In an exemplary embodiment, the present invention comprises a diaphragm type solenoid fluid valve assembly of the class used in the on/off control of pressurized fluid flow. The valve assembly has a non-magnetic housing, a solenoid, a magnetized cylindrical armature residing within the hollow center of the solenoid, a flexible diaphragm fixed to one end of the magnetic armature, a plastic orifice plate, and a flexible diaphragm assembled within a plastic housing. The armature further has a spring between the magnetic armature and solenoid within the plunger guide of the solenoid, wherein the spring and armature are capable of linear motion within the fluid chamber of the valve housing and within the cylindrical plunger guide of the solenoid. The linear motion is controlled by the magnetic field of the solenoid and the spring so as to enable the magnetized armature to abut against the orifice fluid exit of the orifice plate to prevent fluid flow there-through, wherein the diaphragm closes and remains closed so long as residual fluid pressure exits on the side of the armature and flexible diaphragm end. The valve assembly further comprises a solenoid driver adapted to generate a pulse width modulated signal having two voltage levels other than zero volts, so as to control valve operation, wherein the first voltage level is to initiate movement of the magnetized armature, and the second voltage level is to hold the magnetized armature in the energized position. The first voltage level activates the solenoid so as to vibrate, in combination, the magnetic armature, the affixed flexible diaphragm and the spring at the system resonant frequency, whereby the vibrated assembly generates higher engagement force to pull away from the orifice exit hole as would normally be produced otherwise, consequently enabling greater pressure actuation with lower required coil power consumption. The second voltage level provides the minimal power level necessary to sustain the engaged valve only after the value has been engaged by application of the first voltage. In one exemplary embodiment, the first and second voltage levels may be either continuous DC or pulse-width modulated DC.

Figure 2:
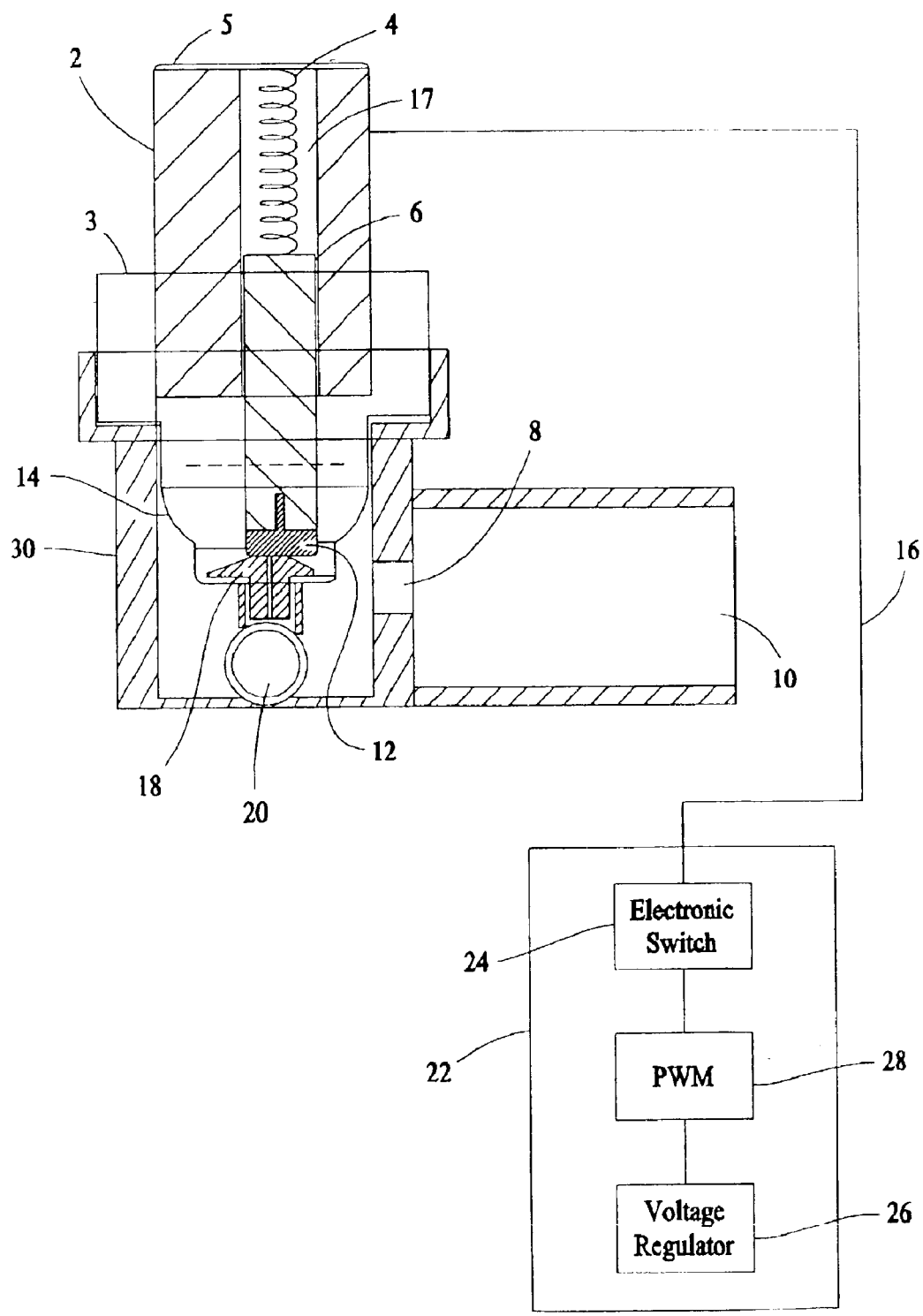
FIG. 2 is an exemplary embodiment of the electromagnetic solenoid valve of the present invention.

FIG. 2 illustrates a cross section of DC solenoid valve 1. Valve 1 comprises a spring 4, an electromagnetic solenoid 2 having an end 5 and a cylindrical plunger guide 17, a securing rim 3 around solenoid 2, a magnetized cylindrical armature 6, a fluid inlet port 8, a housing fluid inlet 10, a diaphragm exit seal 12, a diaphragm 14, solenoid wiring 16, a plastic orifice plate 18, and a fluid exit 20, all supported by a valve housing 30. FIG. 2 also illustrates solenoid driver 22, which comprises a pulse width modulator 28, and an electronic switch 24. The solenoid driver 22 utilizes pulse width modulator 28 and voltage regulator 26 to control the operation of solenoid 2 to maximize the functionality while at the same time minimizing the power requirement of the solenoid, as is further described below. In an exemplary embodiment, this solenoid assembly typically required about 14 watts at 120 VAC to control water flow at about 120 psi (6.94 kg/cm$^2$).

Figure 3:
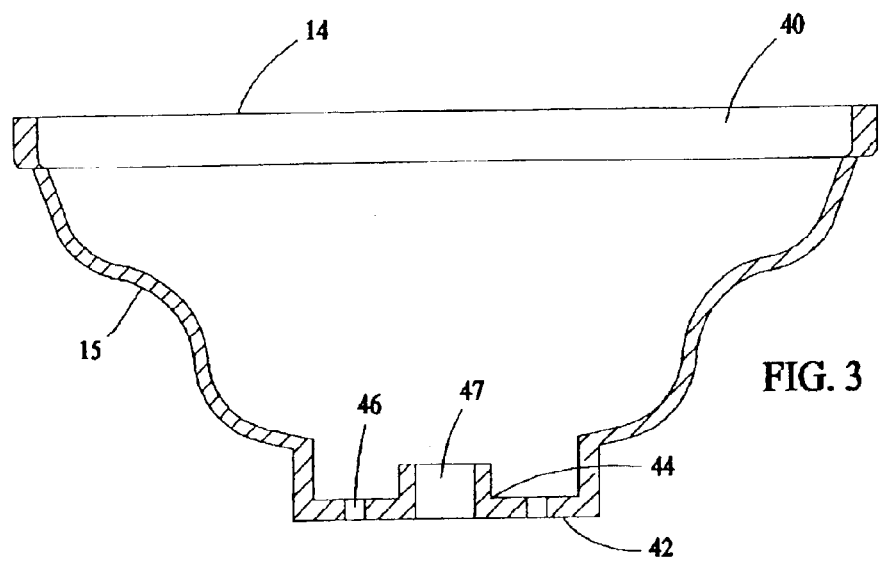
FIGS. 3 and 4 are exemplary embodiments of the diaphragm of the present invention.
Figure 4:
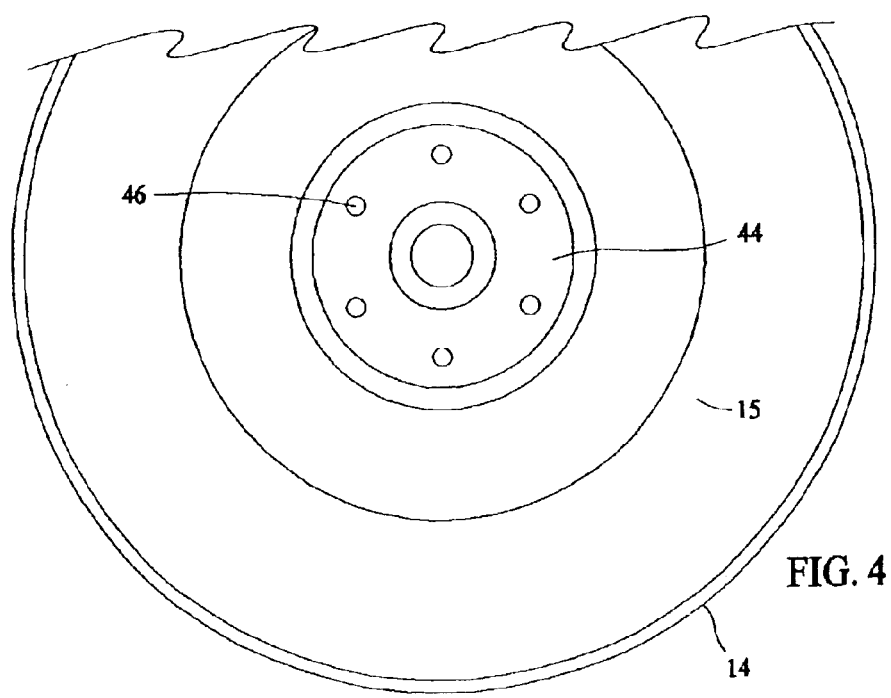

FIGS. 3 and 4 further illustrate diaphragm 14. Typically, there are several diaphragm fluid inlet holes 46 on diaphragm 14 around the circumference of the diaphragm seat 42. A center hole 47 is disposed in the geographical center of diaphragm seat 42. Diaphragm 14 further comprises fold 15, fluid channel 44, diaphragm rim 40 and diaphragm seat 42. Diaphragm rim 40 is designed to form a snug fit with rim 3 of the solenoid 2, as illustrated in FIG. 2. Fold 15 facilitates the inflating and deflation of diaphragm 14 by providing a naturally flexible point of deflection. Diaphragm 14 is typically composed of EPDM rubber. The fluid channel provides a path for fluid to enter the diaphragm from the valve housing fluid inlet 10 (FIG. 2). Diaphragm seat 42 forms a fluid tight seal with the seal surface 32 of the valve housing 30 (FIG. 7) when the diaphragm 14 is inflated. The pressure of the fluid facilitates the water-tight seal because the pressure at the seal surface 32 is at atmospheric pressure and the pressure of the fluid may be up to 175 psi (10.1 kg/cm$^2$), which fluid pressure provides the sealing force to form the water-tight seal of diaphragm 14 against the seal surface 32.

Figure 5:
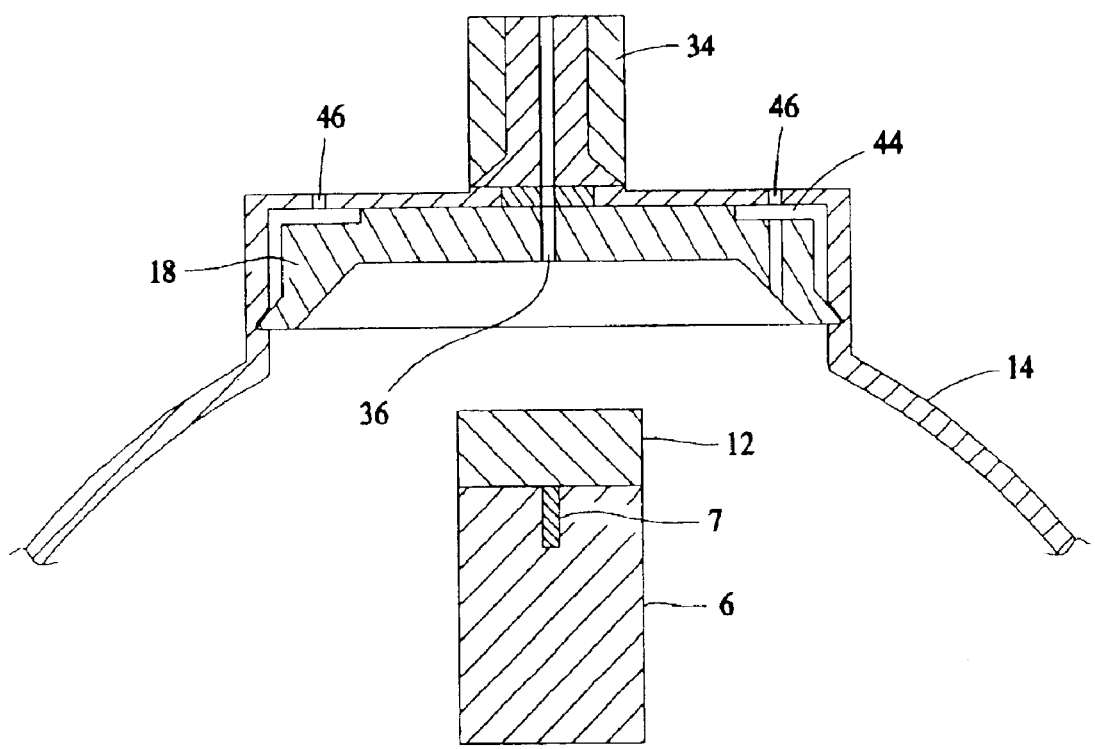
FIG. 5 is an illustration of the diaphragm and orifice plate coupled together of the present invention.
Figure 7:
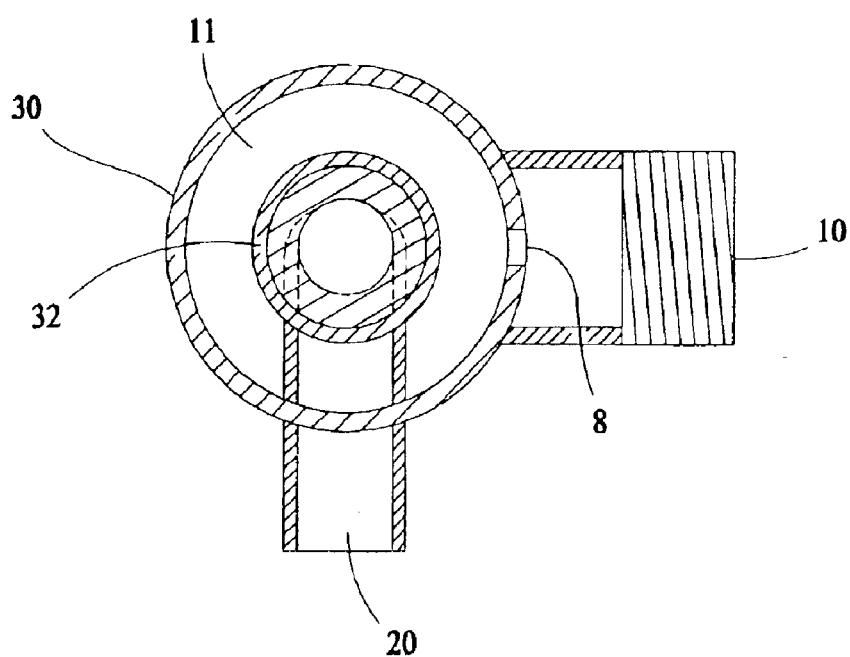

FIG. 5 illustrates the interface between diaphragm 14 and orifice plate 18 (FIG. 2). Diaphragm 14 has center hole 47 through which fin 34 of orifice plate 18 is inserted to form a snug mechanical connection therebetween (FIG. 3). Fluid inlet holes 46 on diaphragm 14 are juxtaposed to orifice fluid inlet 38 so that fluid flow may be sealed from flowing through fluid exit 20 of the valve housing 30 by way of fluid channel 44. Since there is only one orifice fluid inlet 38 any one of the diaphragm fluid inlet holes 46 may be employed to channel fluid into the diaphragm 14. So even in the event that one or more but less that all of the diaphragm fluid inlets 46 are plugged with debris, fluid will continue to flow into the diaphragm 14 if there is a pressure differential between the diaphragm 14 and the fluid chamber 11 (FIG. 7). It is also noted that the orifice fluid exit 36 diameter is greater than the orifice fluid inlet 38. This diameter difference is necessary because it is necessary that the rate at which fluid exits the diaphragm be greater than the rate at which fluid enters the diaphragm when the orifice fluid exit 36 is not covered. In one embodiment the diameter of orifice fluid exit 36 is in a range from about 11 mm to 12 mm. And the diameter of orifice fluid inlet 38 is in a range from about 13 mm to 14 mm.

FIG. 5 further illustrates magnetized cylindrical armature 6 and diaphragm exit seal 12, also known as a grommet. Grommet 12 has a flange 7 for secure attachment to magnetized armature 6. In one exemplary embodiment grommet 12 comprises EPDM rubber. Magnetized armature 6 is a rare earth type magnet which generates a very high magnetic field relative to the size of the magnet. The armature is typically a stainless steel metal alloy. In one exemplary embodiment armature 6 is a Neodymium—35 magnet (i.e. the B*H$_{max}$=35 mega gauss-oersted). Armature 6 may also be a Neodymium 40 type to a Neodymium 45 type magnet or other rare-earth magnetic material such as Sumarium-cobalt. In one exemplary embodiment armature 6 has a diameter of about 0.32 inches (0.81 cm) and a height of about 0.55 inches (1.34 cm) and has a center hole diameter of about 0.15 inches (0.38 cm) to accommodate flange 7 to secure grommet 12. Armature 6 may also be nickel plated and employ a resin coating to minimize corrosion from immersion in the fluid in valve housing 30. Armature 6 is magnetized so that the south pole is at the same end as grommet 12 and the north pole is at the opposite end as grommet 12. It is noted that the polarity of the magnet makes no difference as long as coil polarity is known and is activated in correspondence with the respective magnet polarity. Armature 6 acts as a movable valve plunger that prevents the flow of fluid out of diaphragm 14.

Figure 6:
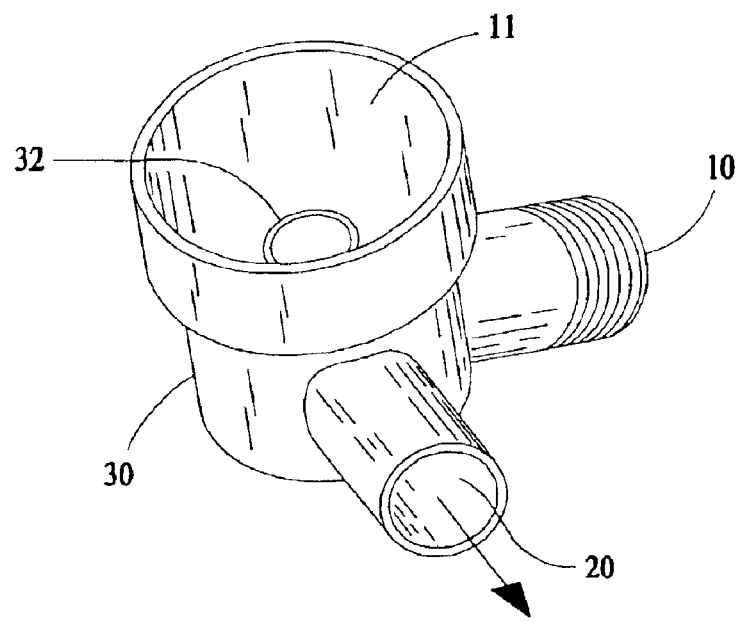
FIGS. 6 and 7 are exemplary embodiments in two views of the valve housing of the present invention.

FIG. 6 further illustrates valve housing 30, fluid chamber 11 and the seal surface 32 from which fluid may exit the housing 30. Fluid enters the fluid chamber 11 from the housing fluid inlet 10 and exits the valve housing 30 through fluid exit 20.

It was determined through experimentation that the combination of the spring 4, armature 6 grommet 12 (FIG. 2), in combination with the resistance of the fluid, in this example water, act together to form a spring mass system having a resonant frequency in the range of about 50–150 hertz. By taking advantage of the resonant frequency of the spring mass system and the charge time of solenoid 2 the power required to retract and hold armature 6 in solenoid 2 is minimized. It was experimentally determined that when solenoid driver 22 was operated to deliver a DC voltage of about 12 volts which is also pulse width modulated in a range of about 50 to about 150 hertz and typically at about 95 hertz, using a duty cycle of about 55%–70%, would provide sufficient magnetic force to retract into the solenoid an armature 6, the armature 6 having at least one the above states characteristics. This DC voltage and frequency is defined as the pull in voltage. Typically, the pull in voltage and duration is less than about 100 milliseconds. The power required to pull in the solenoid is about 0.500 watts.

In this exemplary embodiment solenoid 2 comprises a coil having about 5 to 6 thousand turns of 35 gauge enamel coated wire and has an impedance of about 165 ohms and an inductance of about 0.06 henries, as illustrated in FIG. 2. Once armature 6 has been retracted into solenoid 2 the hysteresis of the armature 6 provides some residual holding force, as such, the power to hold to armature 6 against the spring force is reduced. In this example the spring force is about 0.13 pounds/inch (19.1 g/cm). It was found through experimentation that the voltage applied to solenoid 2 by solenoid driver 22 could be reduce to a value in the range from about 6 volts and the frequency of pulse width modulator 28 could be increased to about 333 hertz, using a duty cycle of about 50%. The increased frequency prevents the coil from being fully charged given the time constant of the coil of about 0.06 henries/165 ohms=363 microseconds. The solenoid 2, however, generates sufficient magnetic field to hold the armature 6 against the above stated spring force. This is referred to as the holding voltage. The power required to hold the solenoid in the energized state is about 15 milli-watts.

Valve assembly 1 operates to enable and disable fluid flow from housing fluid inlet 10 to fluid exit 20. A pulse width modulated signal, having an initial voltage of about 12 volts (the pull-in voltage) is generated by solenoid driver 22 and electrically coupled to solenoid 2 via wiring 16. The pulse width modulated signal may be operated within a range of about 50–150 hertz, depending on the particular spring, diaphragm tip, and magnetic armature characteristics of the valve assembly. The signal is sufficient to generate a magnetic field in solenoid 2 so as to initiate movement of magnetic armature 2, wherein armature 2 has a magnetic polarity in opposition to the polarity of the solenoid field. The polarity of armature 6 and the solenoid 2 is selected such that when the solenoid is energized the armature is retracted into plunger guide 17. Armature 2 linearly retracts into the plunger guide 17 of solenoid 2 against the force of spring 4. Next, after about 100 msec the voltage of solenoid driver 22 is reduced to about 4 volts, the holding voltage. This holding voltage is sufficient to hold armature 2 in the hollow center 17 of solenoid 2 because of the magnetic hysterises of armature 2 and the resonant frequency of the spring mass system of the present invention as described above.

When armature 6 is abutted against the orifice fluid exit 36 via the force exerted by spring 4, pressurized fluid enters the diaphragm 14 through diaphragm inlets 46 around fluid channel 44 and through orifice fluid inlet 38 because of the fluid pressure. The pressurized fluid is not able to exit the diaphragm because there is no exit path. As a result, the fluid pressure within diaphragm 14 is equalized with the fluid pressure at housing inlet 10. The diaphragm is consequently inflated to form a fluid tight seal at seal surface 32. The diaphragm operates in this manner because the pressure at fluid inlet 10 is greater than the pressure at fluid outlet 20. The pressure during the above described operation, at fluid outlet 20, is typically atmospheric pressure. When armature 6 is energized armature 6 breaks the water tight seal at orifice fluid exit 36. Consequently, the pressurized water within diaphragm 14 exits diaphragm 14 at a greater rate than the fluid enters diaphragm 14 causing the pressure within diaphragm 14 to be less than the pressure of the fluid at inlet 10. This action results in the contraction of diaphragm 14 away from seal 32. The pressurized fluid consequently is free to exit housing fluid exit 20 as long as armature 6 is energized with either the pull-in voltage or the holding voltage.

When the solenoid 2 is de-energized the spring force acts against armature 6 to move armature 6 so as to form a seal with orifice fluid exit 36. Consequently, diaphragm 14 fills with pressurized fluid through diaphragm fluid inlet 46, fluid channel 44 and orifice fluid inlet 38. Since this fluid cannot exit the diaphragm it expands the diaphragm to reform a fluid tight seal at seal 32. As a result, the fluid is prevented from flowing from the fluid chamber into fluid exit 20.

In an exemplary embodiment of the present invention the above described fluid valve assembly is utilized in an appliance to act as a water shut-off valve to regulate the flow of household pressurized water within the appliance. By way of example and not limitation, the appliance may be a washing machine, a refrigerator, a dishwasher, or a drinking water dispenser.

In the design of solenoid fluid control valves it has been common practice to provide a cylindrical plunger guide of magnetic material to serve as a housing for the movable valve plunger and a normalizing bias spring. The housing with appropriate assembly to the valve body, by operation of a diaphragm regulates the flow of fluid through a valve assembly. The diaphragm is inflated and deflated, to respectively cover and uncover the fluid outlet port of the valve assembly, by the fluid mechanics of the differential fluid pressure within the valve assembly. When the diaphragm is inflated the fluid port is covered preventing fluid flow through the valve assembly, and alternatively when the fluid port is uncovered fluid flows through the valve assembly.

The present invention provides advantages over the common practice in that because a plated or coated rare earth armature is utilized in the differential pressure diaphragm based valve assembly, the power necessary to initiate movement of the armature to regulate the flow of high pressure water is substantially reduced. In the exemplary embodiment presented above the power demand requirement has been reduced from about 14 watts to less than 1 watt instantaneous and 15 milli-watts holding power from the prior art valve assembly to the present invention. Further, a pulse with modulated signal is used rather than a direct current signal to drive the solenoid so as to take advantage of the resonant frequency and hysterises of the armature and biasing spring to further reduce the power required to hold the armature in an energized mode.

In the present invention a cylindrical armature of rare earth type magnetic material forms a movable valve plunger coupled to a normalizing bias spring to regulate the pressure with a diaphragm of the valve assembly. The solenoid is driven with a pulse width modulated signal at two different voltages to maximize the efficiency of the solenoid and valve assembly. The housing with appropriate assembly to the valve body, by operation of a diaphragm regulates the flow of fluid through a valve assembly. The diaphragm is inflated and deflated, to respectively cover and uncover the fluid outlet port of the valve assembly, by the fluid mechanics of the differential fluid pressure within the valve assembly. When the diaphragm is inflated the fluid port is covered preventing fluid flow through the valve assembly, and alternatively when the fluid port is uncovered fluid flows through the valve assembly.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A diaphragm type solenoid fluid valve assembly of the class used in the on/off control of pressurized fluid flow, said valve assembly having a housing a solenoid, a solenoid end, said valve assembly comprising:

a magnetized cylindrical armature engagingly coupled to said solenoid and residing within the hollow center of said solenoid, said armature comprising a rare earth magnet and further having a spring between said armature and an end of said solenoid, wherein said spring and armature are capable of linear motion within the fluid chamber of said valve housing and within the cylindrical plunger guide of said solenoid, said linear motion being controlled by the magnetic field of said solenoid and said spring so as to enable said magnetized armature to abut against the orifice fluid exit of the orifice plate to prevent fluid flow there-through; and a solenoid driver adapted to generate a pulse width modulated signal having two voltage levels other than zero volts, so as to control valve operation, wherein the first voltage level is to initiate movement of the magnetized armature, and wherein the second voltage level is to hold the magnetized armature in the energized position.

2. The solenoid assembly as recited in claim 1, wherein said magnetized armature is metal plated.

3. The solenoid assembly, as recited in claim 1, wherein said magnetized armature has hysterises that enables the required holding voltage of said solenoid to be less than the required pull in voltage.

4. The solenoid assembly as recited in claim 1, wherein said spring constant is predetermined so that the resonant frequency of the spring, armature, system is in a range from about 50 to about 150 hertz.

5. The solenoid assembly as recited in claim 4, wherein said predetermined spring constant is about 19.1 grams/cm.

6. A solenoid fluid valve assembly of the class used in the on/off control of pressurized fluid flow, comprising:
 a valve housing having a housing fluid inlet fluidly coupled to a fluid chamber therein, said valve housing also having a fluid outlet, fluidly coupled to said fluid chamber and having a seal surface within said fluid chamber so as to prevent fluid from traveling from said fluid inlet to said fluid outlet;
 a diaphragm having at least one diaphragm fluid inlet hole and having a seat and having a fluid channel, said diaphragm engagingly coupled to said valve housing, wherein said seat is further adapted to form a fluid tight seal with said seal surface, thereby enabling said diaphragm to prevent fluid from traveling from said fluid inlet to said fluid outlet;
 an orifice plate having an orifice fluid inlet and an orifice fluid exit, wherein said orifice is coupled to said diaphragm such that fluid flows within said diaphragm through said orifice fluid inlet and out of said diaphragm through said orifice fluid exit;
 a solenoid having a cylindrical plunger guide and having an end, said solenoid mechanically coupled to said valve housing; and
 a magnetized cylindrical armature engagingly coupled to said solenoid and residing within the hollow center of said solenoid, said armature comprising a rare earth magnet and further having a spring affixed to one end of said armature and affixed to the end of said solenoid, wherein said spring and armature are capable of linear motion within the fluid chamber of said valve housing and within the cylindrical plunger guide of said solenoid, said linear motion being controlled by the magnetic field of said solenoid and said spring so as to enable said magnetized armature to abut against the orifice fluid exit of the orifice plate to prevent fluid flow therethrough;
 wherein said solenoid requires a pull in voltage so as to initiate movement of said magnetized armature from a stationary position and wherein said solenoid requires a holding voltage so as to hold said magnetized armature at a position after the initial movement.

7. The solenoid assembly as recited in claim 6, wherein said magnetized armature is metal plated.

8. The solenoid assembly, as recited in claim 6, wherein said magnetized armature has hysterises that enables the required holding voltage of said solenoid to be less than the required pull in voltage.

9. The solenoid assembly as recited in claim 6, wherein said spring constant is predetermined so that the resonant frequency of the spring, armature, system is in a range from about 50 to about 150 hertz.

10. The solenoid assembly as recited in claim 9, wherein said predetermined spring constant is about 19.1 grams/cm.

11. A diaphragm type solenoid fluid valve assembly of the class used in the on/off control of pressurized fluid flow, said valve assembly having a housing a solenoid, a solenoid end, said valve assembly comprising:
 a magnetized cylindrical armature engagingly coupled to said solenoid and residing within the hollow center of said solenoid, said armature comprising a rare earth magnet and further having a spring between said armature and an end of said solenoid, wherein said spring and armature are capable of linear motion within the fluid chamber of said valve housing and within the cylindrical plunger guide of said solenoid, said linear motion being controlled by the magnetic field of said solenoid and said spring so as to enable said magnetized armature to abut against the orifice fluid exit of the orifice plate to prevent fluid flow there-through; and
 a solenoid driver adapted to generate a pulse width modulated signal having two voltage levels other than zero volts, so as to control valve operation, wherein the first voltage level is to initiate movement of the magnetized armature, the second voltage level is to hold the magnetized armature in the energized position, and said spring has a spring constant that is predetermined so the resonant frequency of the spring, armature, system is in a range from about 50 to about 150 hertz.

* * * * *